United States Patent [19]

Takashi

[11] Patent Number: 5,446,563
[45] Date of Patent: Aug. 29, 1995

[54] PHOTOCONDUCTOR COUPLED LIQUID CRYSTAL LIGHT VALVE WITH IMPURITY DOPING WHICH VARIES IN THE THICKNESS DIRECTION

[75] Inventor: Hayakawa Takashi, Soraku, Japan

[73] Assignee: Sharp Kabushiki Kaisha, Osaka, Japan

[21] Appl. No.: 28,368

[22] Filed: Mar. 9, 1993

[30] Foreign Application Priority Data

Mar. 10, 1992 [JP] Japan ................. 4-051611

[51] Int. Cl.⁶ .............................................. G02F 1/135
[52] U.S. Cl. ........................................ 359/72; 430/95; 430/65; 257/53
[58] Field of Search ............... 359/72; 430/95, 65, 430/20; 257/53, 55

[56] References Cited

U.S. PATENT DOCUMENTS

| | | | |
|---|---|---|---|
| 3,932,025 | 1/1976 | Lakatos et al. | 430/20 |
| 3,976,361 | 8/1976 | Fraas et al. | 359/72 |
| 4,538,884 | 9/1985 | Masaki | 359/72 |
| 4,539,283 | 9/1985 | Shirai et al. | 430/61 |
| 4,632,894 | 12/1986 | Ohashi et al. | 430/84 |
| 4,672,014 | 6/1987 | Joiner et al. | 430/20 |
| 4,804,604 | 2/1989 | Shirai et al. | 430/65 |
| 5,225,921 | 6/1993 | Audas et al. | 359/72 |
| 5,258,250 | 11/1993 | Shirai et al. | 430/65 |
| 5,313,288 | 5/1994 | Takanashi | 359/72 |

FOREIGN PATENT DOCUMENTS 3-18829  6/1989  Japan .

*Primary Examiner*—William L. Sikes
*Assistant Examiner*—Kenneth Parker
*Attorney, Agent, or Firm*—David G. Conlin; Kevin J. Fournier

[57] ABSTRACT

A photoconductor coupled liquid crystal light valve having at least a photoconductive layer, an optical reflection layer, and a liquid crystal layer between a pair of electrodes, wherein the photoconductive layer is made of amorphous silicon layer, and an impurity doped in the photoconductive layer is uniform in amount in the in-plane direction of the photoconductive layer and continuously higher in concentration in the layer-thickness direction from the electrode side toward the optical reflection layer side.

2 Claims, 4 Drawing Sheets

PHOTOCONDUCTOR COUPLED LIQUID CRYSTAL LIGHT VALVE WITH IMPURITY DOPING WHICH VARIES IN THE THICKNESS DIRECTION

BACKGROUND OF THE INVENTION

1. Field of the Invention

The present invention relates to a photoconductor coupled liquid crystal light valve.

2. Description of the Prior Art

FIG. 5 shows the construction of a commonly used liquid crystal light valve. Referring to FIG. 5, there are disposed a photoconductive layer 11, a liquid crystal layer 2, transparent electrodes 3 provided on both sides of the photoconductive layer 11 and the liquid crystal layer 2 so as to sandwich them, a voltage applying means 4 for applying a voltage to the transparent electrodes 3, and an optical reflection layer 5 and an orientation film 6 both provided between the photoconductive layer 11 and the liquid crystal layer 2. Further, substrates 7 are disposed outside the transparent electrodes.

Next the basic principle of operation of this device is described. It is assumed for simplicity that the resistance value of the optical reflection layer is far less than those of the photoconductive layer and the liquid crystal layer. First, a voltage $V_0$ is applied from external power supply to the photoconductive layer and the liquid crystal layer through the transparent electrodes. The voltages applied to the liquid crystal layer and the photoconductive layer are such values that $V_0$ has been allotted in proportion to the resistance values of the two layers, where the voltage applied to the liquid crystal layer with no incident light thereon results in a value substantially less than the threshold voltage (Vsl) at which the liquid crystal layer produces the electro-optical effect. This means that the liquid crystal layer has no electro-optical effect developed in its earlier state. A schematic illustration of the charge transfer that appear in this device at this point is given in FIG. 2 by way of energy band diagram.

In the above-described state, when light is irradiated to the photoconductive layer (assuming the region where light has been applied to be Pcl, and the region where not to be Pcd), the resistance (Rp) of the photoconductive layer in Pcl reduces to a great extent, resulting in a value far smaller than the resistance of the liquid crystal, layer, so that most of Vsl greater than $V_0$ is applied to the liquid crystal layer in Pcl. As a result, there develops an electro-optical effect to the liquid crystal layer in Pcl. In contrast to this, the liquid crystal layer in Pcd is unchange with the initial voltage applied thereto, causing no electro-optical effect to occur. Accordingly, at this point an optical pattern (optical information has been written into the liquid crystal layer. A schematic illustration of the charge transfer that appear in this device at this point is given in FIG. 3.

It is known heretofore that amorphous silicon (abbreviated as a-Si) containing hydrogen or halogen is used as the photoconductive layer (e.g. Japanese Patent Laid-Open Publications No. SHO 58-34435, SHO 58-34436, SHO 58-199327, SHO 59-81627, SHO 59-170820, etc). Otherwise, also known is use of organic photoconductive layer, amorphous selenium photoconductive layer, and the like.

However, referring to FIG. 3, optically excited carriers that have reached the a-Si layer on the side of the optical reflection layer in the light incident region must stay in the same region at least until liquid crystals complete a response in correspondence to the change in voltage. If the optically excited carriers drifted sideways so as to spread to Pcd region, the voltage applied to the liquid crystals in Pcd region would exceed Vcl, not only deteriorating the resolution but also drawing some different image from the writing image, with the resulting image disordered.

Japanese Patent Laid-Open Publication No. HEI 3-18829 has disclosed a photoconductor coupled liquid crystal light valve which uses an island-shaped metal mirror the optical reflection layer for the purpose of preventing any deterioration in the image resolution.

However, this island-shaped metal mirror not only serves as an optical reflection layer, but also functions to reduce the conductivity of the photoconductive layer in the in-plane direction, thus preventing any deterioration in resolution. Accordingly, one pixel is defined depending on the size of the island-shaped metal mirror. Moreover, making the island-shaped metal mirror involves the steps of forming a metal thin film and subsequently etching, thus adding to the process. These added processes have been a cause for increasing the cost.

In addition, there has been made no description in the prior art on the liquid crystal light valve in which special-treatment is made on the a-Si or other photoconductive layer on the side of the optical reflection layer or on its interface to prevent the arrival of carriers from the sideway drift.

SUMMARY OF THE INVENTION

According to the present invention, there is provided a photoconductor coupled liquid crystal light valve having at least a photoconductive layer, an optical reflection layer, and a liquid crystal layer between a pair of electrodes, wherein the photoconductive layer is made of amorphous silicon layer, and an impurity doped in the photoconductive layer is uniform in amount in the in-plane direction of the photoconductive layer and continuously higher in concentration in the layer-thickness direction from the electrode side toward the optical reflection layer side.

DETAILED DESCRIPTION OF THE PREFERRED EMBODIMENTS

As a pair of electrodes in this invention, ITO films, for example, may be used. To provide the optical reflection layer, normally, two types of materials having substantially different refractive indices to each other, for example, in combination of $MgF_2$ and ZnS or Si and $SiO_2$, are laminated to 10 to 15 layers at a film thickness of 0.1 to 0.05 μm for each one layer.

The liquid crystal layer is exemplified by phenylcyclohexane-based nematic liquid crystals or esterbased ferroelectric liquid crystals, but not limited to these. Cholesteric nonanoate may be mixed at 7 to 8% by weight as a chiral dopant.

The photoconductive layer can be obtained by doping a-Si with impurities. The impurities for doping are exemplified by elements belonging to the group 3A in the periodic table such as B and Al, elements belonging to the group 5A in the periodic table such as P, N, and As, or carbon element or oxygen element, or the like.

The laminating method is, for example, plasma CVD (hereinafter, abbreviated as PCVD). The doping amount of the impurities should be uniform in the in-plane direction and nonuniform in the layer-thickness direction, the doping being implemented continuously such that the higher concentration results toward the optical reflection layer side. The doping amount is controlled by changing the amount of raw gas of impurities to be mixed with the raw gas of such as $SiH_4$ or $Si_2H_6$ to be introduced.

The increase ratio of the doping amount can be such as graphed in FIG. 4 (a) through (e).

EXAMPLE 1

Figure 1:
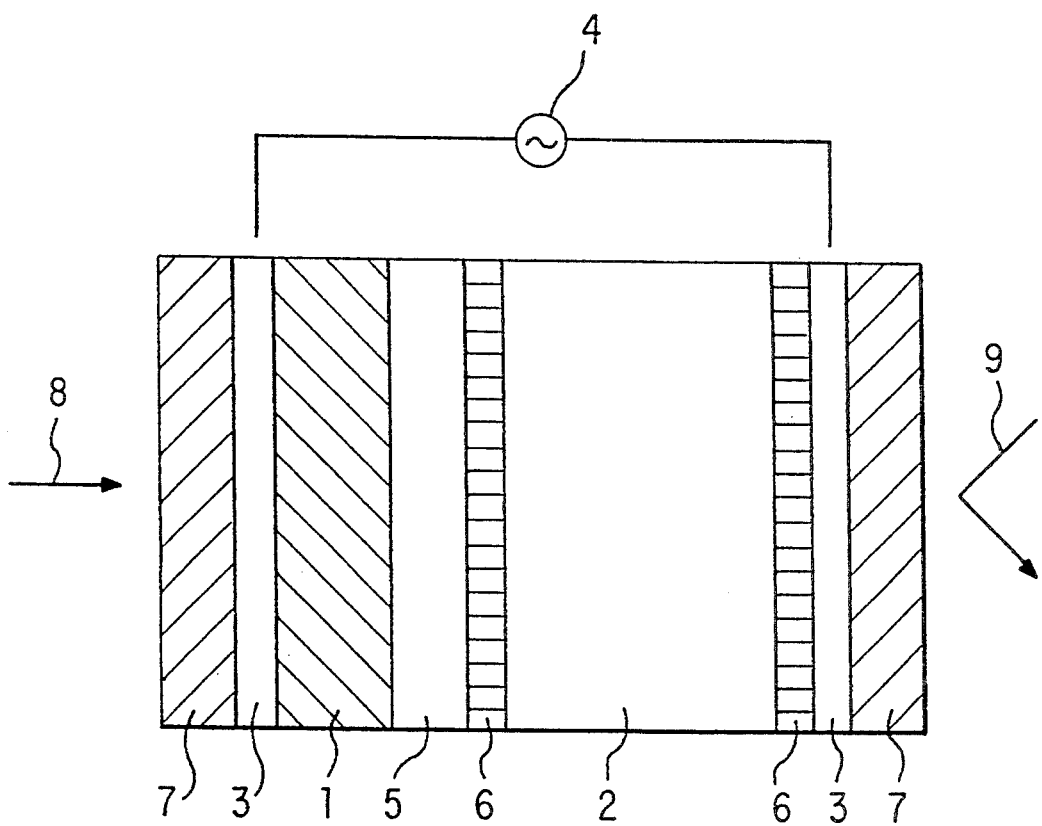
FIG. 1 is a schematic view of the photoconductive layer according to the present invention.
Figure 2:
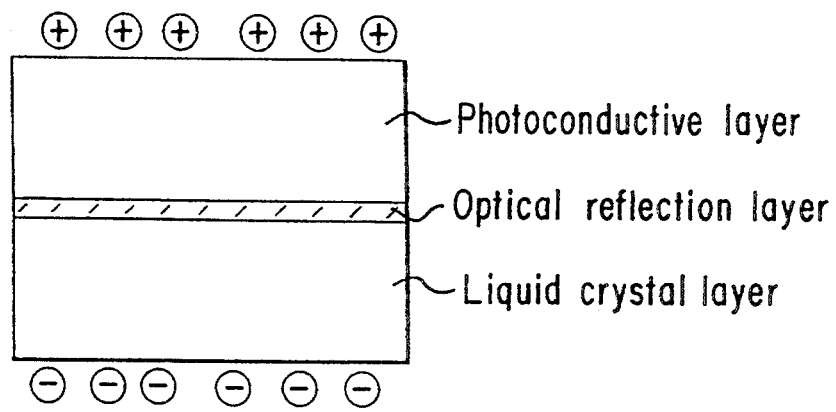
FIG. 2 is a schematic view showing the basic operation of the photoconductor coupled liquid crystal light valve.
Figure 3:
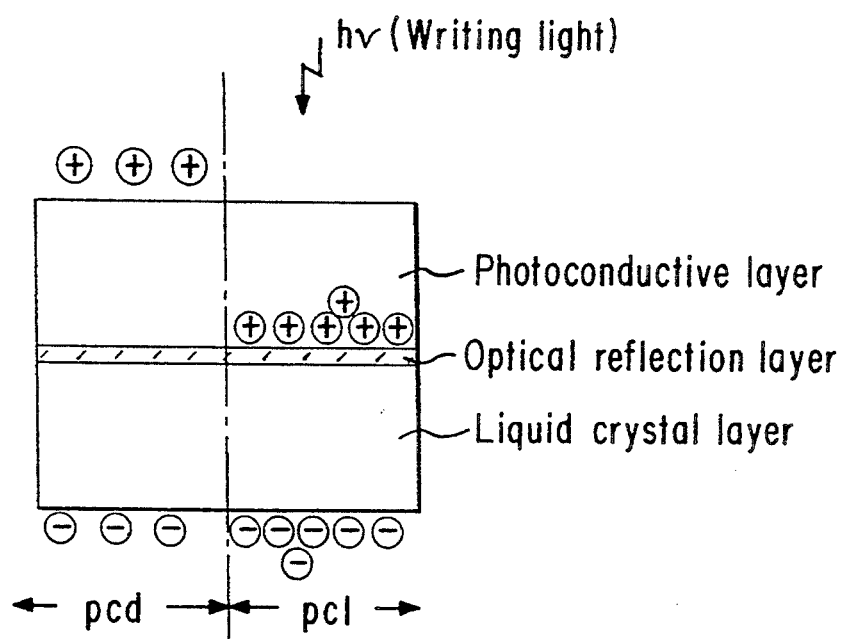
FIG. 3 is a schematic view showing the basic operation of the photoconductor coupled liquid crystal light valve.
Figure 4A:
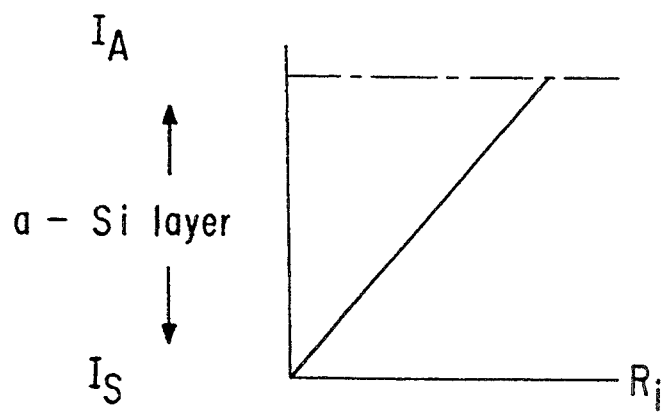
FIGS. 4(a)–4(e) are views illustrating the doping amount of impurity for the photoconductive layer in the photoconductor coupled liquid crystal light according to the present invention.
Figure 4B:
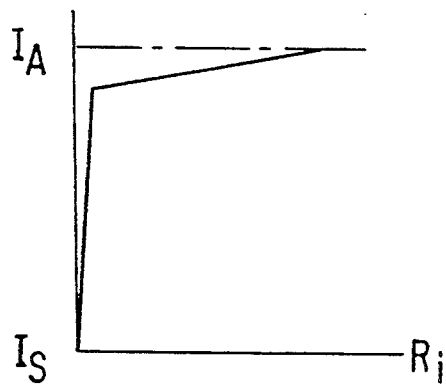
Figure 4C:
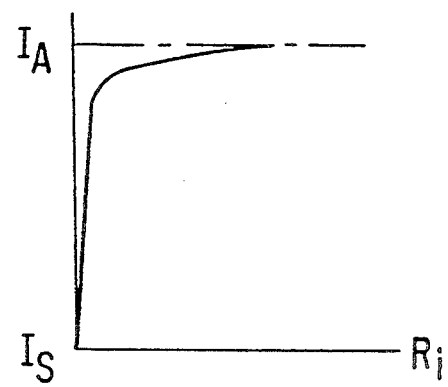
Figure 4D:
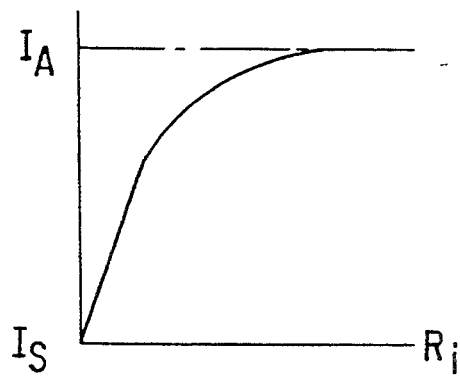
Figure 4E:
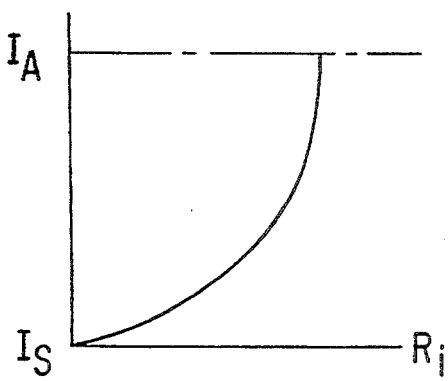
Figure 5:
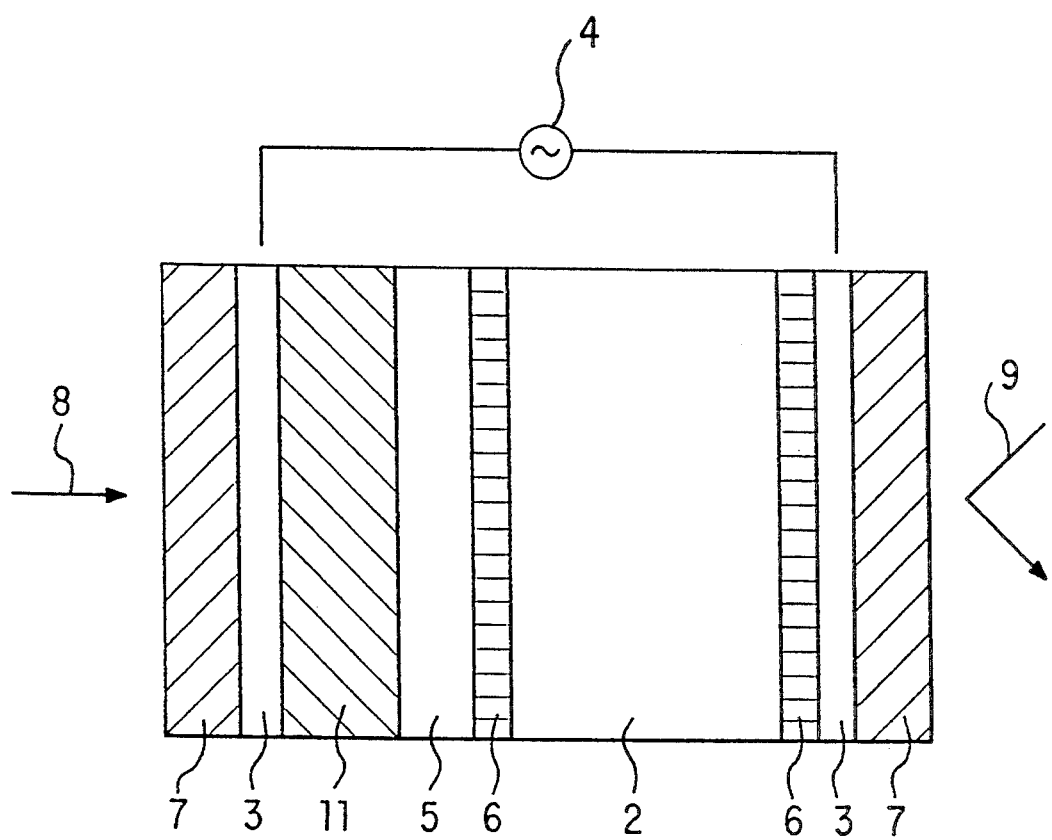
FIG. 5 is a schematic view of a prior-art photoconductor coupled liquid crystal light valve.

A photoconductor coupled liquid crystal light valve according to the present invention as shown in FIG. 1 is fabricated. In FIG. 1, reference numeral 1 denotes a photoconductive layer according to the present invention.

First, a transparent electrode 3 made of ITO was deposited on a glass substrate 7 (CONIG 7059) using a vacuum deposition apparatus. Then, with the substrate set in a PCVD system, plasma was excited under the conditions as listed in Table 1, preparing an a-Si layer as a photoconductive layer 1 at a layer thickness of 4 μ.

TABLE I

| $SiH_4$ amount (sscm) | $B_2H_6$ amount (0.3% in $H_2$) (sccm) | RF power (w) | Degree of vacuum (Torr) | Substrate temperature (°C.) |
|---|---|---|---|---|
| 80 | 0.4 → 8.0 | 200 | 0.25 | 275 |

The fact that in the table the doping amount of $B_2H_6$ is increased from 0.4 to 8 sccm means that the doping amount is continuously increased from the a-Si photoconductive layer support member side toward the optical reflection layer.

Thereafter, Si-$SiO_2$ layer was stacked 10 to 15 layers in the vacuum deposition apparatus by electron beam deposition, so as to laminate an optical reflection layer 5 having a layer thickness of 1.3 to 2.3 μm. Further, a polyimide film was formed by spin coating, and a perpendicular-orientation film 6 treated for molecular orientation by rubbing process was prepared at a film thickness of 0.1 μm on the optical reflection layer 5.

Besides this, on the substrate 7 was stacked a transparent electrode 3 (ITO) and further thereon the orientation film 6.

The above two glass substrates 7 on which various layers were stacked over were assembled with an interval of 7 μm so that the orientation films 6 were opposed to each other. Finally, with cholesteric nonanoate mixed as a chiral dopant into phenylcyclohexane-based nematic liquid crystals at 7 to 8% by weight, a liquid crystal layer 2 was sealed into the space of this interval so as to have a layer thickness of 7 μm and a twist pitch of approx. 20% with respect to the layer thickness, thus fabricating a photoconductor coupled liquid crystal light valve.

The writing of an image into this light valve was effected by applying a laser beam (680 nm) as writing light 8 to the photoconductive layer from its side as shown in FIG. 1 and simultaneously applying an electric field of 1 kHz and 6 V to between the two ITO electrodes.

Next, the reading of the written image was done by applying white reading light 9 by use of a halogen lamp from the liquid crystal side to the photoconductive layer, and as a result, a clear image could be reproduced which is free from any deterioration in resolution and any sideway drift.

Succeedingly, by applying an ac electric field of 10 V to the transparent electrodes 3, the erasing of the written image could be accomplished.

Subsequently, with this liquid crystal light valve, a series of processes of writing, reading, and image erasing were repeatedly carried out, and as a result there could be seen no phenomenon of the written image's remaining. Moreover, it was verified that the carriers trapped during writing had been completely neutralized during image erasing.

EXAMPLE 2

A photoconductor coupled liquid crystal light valve was fabricated under the same conditions as in Example 1 except that the layer thickness of the photoconductive layer was 4 μm, the $CH_4$ flow rate during the fabrication was linearly increased from 0 to 8.0 sccm and so was the $B_2H_6$ flow rate diluted in $H_2$ at a concentration of 0.3% from 0.4 to 25 sccm, and that both of C and B were doped.

With this light valve, the writing, reading, and erasing of an image were carried out in the same way as in Example 1, and as a result, a clear image free from any deterioration in resolution and any sideway drift could be reproduced, as in Example 1.

After repeating a series of processes of writing, reading, and image erasing, there was no image remaining phenomenon.

As described hereinabove, by doping the a-Si photoconductive layer with at least one element from among elements belonging to the group 3A in the periodic table, such as B and Al, elements belonging to the group 5A in the periodic table, such as P, N, and As, and C or O element, and besides by implementing the doping continuously in such a way that the doping amount of the element is uniform in the in-plane direction of the a-Si photoconductive layer and nonuniform in the layer-thickness direction such that the higher concentration results toward the optical reflection layer side, the density of trapped carriers in the amorphous silicon layer on the side of the optical reflection layer is increased, thereby trapping the optically excited carriers that have reached the optical reflection layer side. As a result, it becomes possible to prevent sideway drift of the carriers and disorder of the image. Also, by increasing the doping amount toward the optical reflection layer continuously and gradually, it becomes possible to fabricate the photoconductive layer in a continuous manner and unnecessary to provide a special layer like a metal mirror, other than the case where the photoconductive layer is fabricated so as to be divided into one region at which it is doped and the other region at which not. This contributes to shortening the time required for device fabrication. Moreover any noncontinuity in energy band of the photoconductive layer can be eliminated, allowing a smooth running of the carriers within the photoconductive layer. Thus, it has become feasible to fabricate a liquid crystal light valve excellent in response and the contrast in an image to be formed.

It is to be noted that since the trapped optical carriers are neutralized by an electric field applied during image erasing in the direction inverse to that during writing, there will occur no problem such as the written image's remaining.

What is claimed is:

1. A photoconductor coupled liquid crystal light valve having at least a photoconductive layer, an optical reflection layer, and a liquid crystal layer between a pair of electrodes, wherein the photoconductive layer is made of amorphous silicon layer, and an impurity doped in the photoconductive layer is uniform in amount in the in-plane direction of the photoconductive layer and continuously higher in concentration in the layer-thickness direction from the electrode side toward the optical reflection layer side.

2. A photoconductor coupled liquid crystal light valve as claimed in claim 1, wherein the impurity is an element belonging to the group 3A or group 5A in the periodic table or carbon element or oxygen element.

* * * * *